(12) United States Patent
Carrier et al.

(10) Patent No.: US 11,163,954 B2
(45) Date of Patent: Nov. 2, 2021

(54) PROPAGATION OF ANNOTATION METADATA TO OVERLAPPING ANNOTATIONS OF SYNONYMOUS TYPE

(71) Applicant: International Business Machines Corporation, Armonk, NY (US)

(72) Inventors: Scott Carrier, Apex, NC (US); Brendan Bull, Durham, NC (US); Dwi Sianto Mansjur, Cary, NC (US); Paul Lewis Felt, Springville, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/574,167

(22) Filed: Sep. 18, 2019

(65) Prior Publication Data

US 2021/0081496 A1    Mar. 18, 2021

(51) Int. Cl.
*G06F 40/284* (2020.01)
*G06F 16/33* (2019.01)
*G06F 40/247* (2020.01)
*G06F 40/169* (2020.01)

(52) U.S. Cl.
CPC ........ *G06F 40/284* (2020.01); *G06F 16/3347* (2019.01); *G06F 40/247* (2020.01)

(58) Field of Classification Search
CPC ...... G06F 40/169; G06F 40/30; G06F 40/284; G06F 16/907; G06F 16/164; G06F 16/24573; G06F 40/242; G06F 16/35; G06F 16/285; G06F 40/279; G06F 40/10; G06F 40/20; G06F 40/221; G06F 40/247; G06F 16/3347; G06F 16/5866; G06F 16/3344; G06F 16/355; G06F 16/75; G06F 16/783; G06F 16/906; G06F 40/237; G10L 15/1815; G10L 15/26; G10L 13/08; G10L 15/065; G10L 15/083; G10L 15/28; G06K 9/723; G06K 2209/01; G06K 9/344
See application file for complete search history.

(56) References Cited

U.S. PATENT DOCUMENTS

| | | | |
|---|---|---|---|
| 6,470,306 B1 * | 10/2002 | Pringle | G06F 40/58 704/3 |
| 6,549,922 B1 | 4/2003 | Srivastava et al. | |
| 8,065,302 B2 | 11/2011 | Sridhar et al. | |

(Continued)

FOREIGN PATENT DOCUMENTS

CN    101777071 A    7/2010

*Primary Examiner* — Linda Wong
(74) *Attorney, Agent, or Firm* — Cantor Colburn LLP; Ryan Lewis (57) ABSTRACT

Aspects of the invention include systems and methods for the propagation of annotation metadata to overlapping annotations of a synonymous type. A non-limiting example computer-implemented method includes performing a comparison of a set of annotations to detect a subset of annotations that are candidates of being synonymous based on a first analysis. Whether a first annotation of the subset of annotations is synonymous with a second annotation of the subset of annotations is determined based on a second analysis. Distinct annotation metadata of the first annotation are cross-propogated with annotation metadata of the second annotation based on the second analysis.

17 Claims, 6 Drawing Sheets

(56) References Cited

U.S. PATENT DOCUMENTS

| | | | |
|---|---|---|---|
| 8,311,997 B1* | 11/2012 | Kauchak | G06F 16/353 |
| | | | 707/705 |
| 8,645,679 B2 | 2/2014 | Ferracane et al. | |
| 9,626,348 B2 | 4/2017 | Naim et al. | |
| 9,965,458 B2* | 5/2018 | Munro | G06F 40/284 |
| 9,984,164 B2 | 5/2018 | Walther et al. | |
| 2004/0220797 A1* | 11/2004 | Wang | G06F 40/211 |
| | | | 704/9 |
| 2009/0281791 A1* | 11/2009 | Li | G06F 40/284 |
| | | | 704/9 |
| 2010/0195909 A1* | 8/2010 | Wasson | G06F 40/169 |
| | | | 382/176 |
| 2012/0210204 A1* | 8/2012 | Kramer | G06F 16/50 |
| | | | 715/230 |
| 2016/0048574 A1* | 2/2016 | Avery | G06F 40/169 |
| | | | 707/740 |
| 2019/0213196 A1* | 7/2019 | Komedani | G06F 40/169 |

* cited by examiner

FIG. 1

200 — Original Annotations

Annotation 1                Annotation 2                          Annotation 3

204 — "Cisplatin": [     206 — "MedicationInd": [                 208 — "Drug": [
{                        {                                        {
 "cui": "C0008838",       "type": "aci.MedicationInd",             "type": "Drug",
 "preferredName": "Cisplatin",   "begin": 0,                       "begin": 0,
 "type": "umls.PharmacologicSubstance",  "end": 9,          210 —  "end": 9,
212 — "begin": 0,    214 — "coveredText": "cisplatin",             "confidence": .829,
 "end": 9,                "rxNormID": "2555"                      }
 "coveredText": "cisplatin"  }
}

202 — Cross-Propagated Annotations

Annotation 1                Annotation 2                          Annotation 3

"Cisplatin": [            "MedicationInd": [                      208 — "Drug": [
{                         {                                        {
 "cui": "C0008838",        "type": "aci.MedicationInd",             "type": "Drug",
 "preferredName": "Cisplatin",  "begin": 0,                         "begin": 0,
 "type": "umls.PharmacologicSubstance",  "end": 9,           210 —  "end": 9,
 "begin": 0,               "coveredText": "cisplatin",              "confidence": .829,
 "end": 9,                 "rxNormID": "2555",                216 — "cui": "C0008838",
 "coveredText": "cisplatin",  "cui": "C0008838",                "rxNormID": "2555"
 "rxNormID": "2555",   "confidence": .829                  }
 "confidence": .829   }
}

PROPAGATION OF ANNOTATION METADATA TO OVERLAPPING ANNOTATIONS OF SYNONYMOUS TYPE

BACKGROUND

The present invention generally relates data annotation, and more specifically, relates to the propagation of annotation metadata to overlapping annotations of a synonymous type.

Source data annotation is a process of labeling unstructured data to make it usable for downstream processing. Annotating or labeling data organizes unstructured data to make the data more understandable to computer-based processes. Furthermore, annotation is an important aspect of the improvement of computer model performance. Data annotation highlights the important words, texts, or objects of source data by using the annotation techniques and makes source data more recognizable to computer systems.

SUMMARY

Embodiments of the present invention are directed to the propagation of annotation metadata to overlapping annotations of a synonymous type. A non-limiting example computer-implemented method includes performing a comparison of a set of annotations to detect a subset of annotations that are candidates of being synonymous based on a first analysis. Whether a first annotation of the subset of annotations is synonymous with a second annotation of the subset of annotations is determined based on a second analysis. Distinct annotation metadata of the first annotation is cross-propogated with annotation metadata of the second annotation based on the second analysis.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

One or more embodiments of the present invention provide methods and systems for cross-propagating descriptive metadata of one annotation to a synonymous annotation. Therefore, if two annotators generate different annotations, each annotation will include the associated metadata from the other annotation. This improves the efficiency and performance of large-scale data processing, as the relevance of an annotation is more apparent due to having common metadata with another synonymous annotation.

The amount of structured and unstructured data stored and available for analysis continues to increase rapidly. The ability of data scientists, companies, and individuals to access and analyze large quantities of electronic data sources for intelligent decision making is a key element to success in modern society. Structured data is typically stored in large data warehouses, and several tools exist to enable parsing and analysis of the data. However, a growing interest has developed for accessing and analyzing unstructured data for intelligent decision making. Unstructured data includes word processing documents, e-mail, web pages, text files, natural language text, images, and audio and video streams.

Text annotation is a method that uses natural language processing and machine learning techniques for processing and information extraction for unstructured data. Text annotation consists of descriptively and semantically analyzing unstructured text and identifying terms corresponding to concepts and descriptive entities. Text annotation is performed by an annotator, that operates using a specific set of models, rules, and dictionaries. A text annotation is metadata embedded in computer code that describes a text span in terms of class, description, concept, etc.

Each annotator operates using a specific set of models, rules, and dictionaries. Therefore, if two annotators are annotating, each annotator generates its own annotations and metadata for text based on its own models, rules, and dictionaries. In some instances, the generated annotations do not provide a degree of descriptiveness to be helpful. Furthermore, the associated annotation metadata does provide further guidance as to the relevance of the annotation.

For example, in a conventional medical-based annotation system, multiple annotators can generate respective annotations for a span of text. Furthermore, each annotation may include respective metadata related to an annotation. However, even if the annotations are related, conventional methods fail to recognize the relation and do not cross-populate the metadata across the different annotations. As a result, valuable metadata related to the annotation is left separated between annotations.

One or more embodiments of the present invention address one or more of the above-described shortcomings of the prior art by providing systems and methods for determining which annotations are synonymous, regardless of the generating annotator. Once the annotations are determined to be synonymous, the annotation metadata for each annotation is cross-propagated, such that each annotation includes each instance of annotation metadata. Therefore, in the above described example, the annotations derived from both groups of annotators can be determined to be synonymous. This enables the system to cross-propagate the medical code annotation across the annotations. As a result, a downstream processing system reviewing the annotation has better guidance as to the relevance of each annotation.

Figure 1:
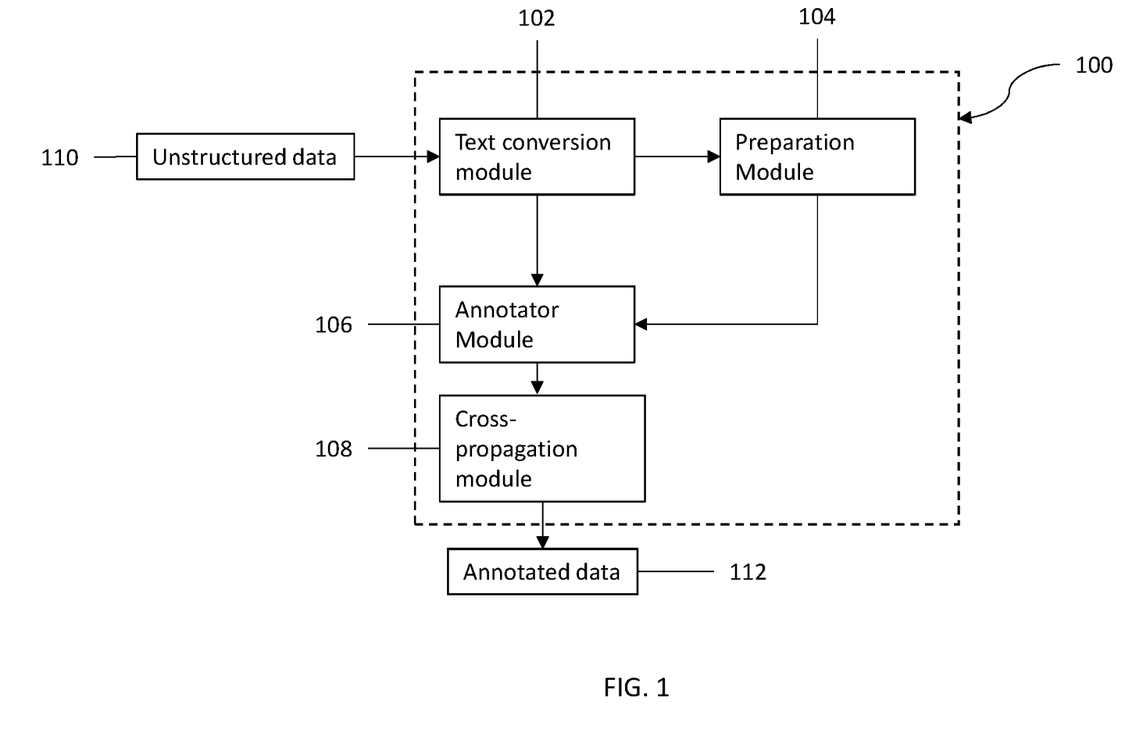
FIG. 1 illustrates a block diagram of components of an annotation system in accordance with one or more embodiments of the present invention.

Turning now to FIG. 1, a block diagram of a system 100 to annotate an unstructured span of text or unstructured data is generally shown in accordance with one or more embodiments of the present invention. The system 100 includes a text conversion module 102, a preparation module 104, an annotator module 106, and a cross-propagation module 108. A receiver (not shown) of the text conversion module 102 receives a document, a portion of which includes unstructured data 110 from a data source (not shown). A document can be in any form, for example, PDF, DOC, HTML, etc. The text conversion module 102 converts the document into plain text.

The text conversion module 102 transmits the converted document to the preparation module 104 and the annotator module 106, which includes multiple annotators. The preparation module 104 retrieves information pertaining to a model(s) and dictionaries for the respective annotators (not shown) from a server, for example, a cloud computing server. A model includes a list of attributes that describe an entity, while the dictionary provides a list of all possible values for an attribute. The preparation module 104 queries the server system to extract the entity model or list of attributes describing an entity and creates a dictionary file for each attribute including existing values for that attribute ascertained from the server. The preparation module 104 may further use any existing structured and unstructured data to obtain rules and models to assist with annotating information from the converted document.

The preparation module 104 transmits/shares the models, dictionaries, and learned rules and models to annotator module 106. Each annotator of the annotator module 106 receives respective dictionaries, learned rules, and models to use for extracting information from the unstructured document and produce annotations. An annotation includes an extracted value from the unstructured data for a specific attribute of an entity. The annotator module 106 may employ fuzzy matching between the unstructured data and dictionary entries to produce the annotations, rule-based techniques for attributes not residing in the dictionaries, and/or learning-based techniques. In addition, each annotator of the annotator module 106 uses the dictionaries, learned rules, and models to further include respective annotation metadata.

The annotator module 106 is equipped with artificial intelligence circuitry to employ one or more artificial intelligence models to assist with the annotation generation. The artificial intelligence models include, but are not limited to decision trees, decision tables, support vector machines, clustering models, hidden Markov models, and Gaussian mixture models. An artificial intelligence model is trained using a training set compiled of structured text, unstructured text, and annotations.

Each annotator of the annotator module 106 provides its annotations to the cross-propagation module 108. The cross-propagation module 108 receives an annotation for the span of the unstructured text from each respective annotator. The cross-propagation module 108 engages in a process, for example, a pairwise comparison, of each of the annotations to determine if any annotations are a candidate of being synonymous with another annotation. Any candidate synonymous annotations are retrieved, and annotations that are an aggregation of multiple tokens are divided into their respective component tokens. For example, the aggregated annotation, "MedicationIndicator" is divided into two tokens, "Medication" and "Indicator".

The divided annotations are processed to determine if any annotation is synonymous with another anonymous. For example, a word vector is used to determine any semantic relationships or similarity between the annotations. A word vector includes a row of real valued points, where each point captures a dimension of the word's meaning. The word vector is compared to other word vectors of respective annotations to determine whether they are semantically related. The semantic relationships are scored and the cross-propagation module 108 determines whether the annotations are synonymous by determining whether the score is above a threshold amount. If the score exceeds the threshold amount, the cross-propagation module 108, cross-propagates the annotation metadata across the synonymous annotations, such that each annotation includes metadata from any other synonymous annotation.

Figure 2:
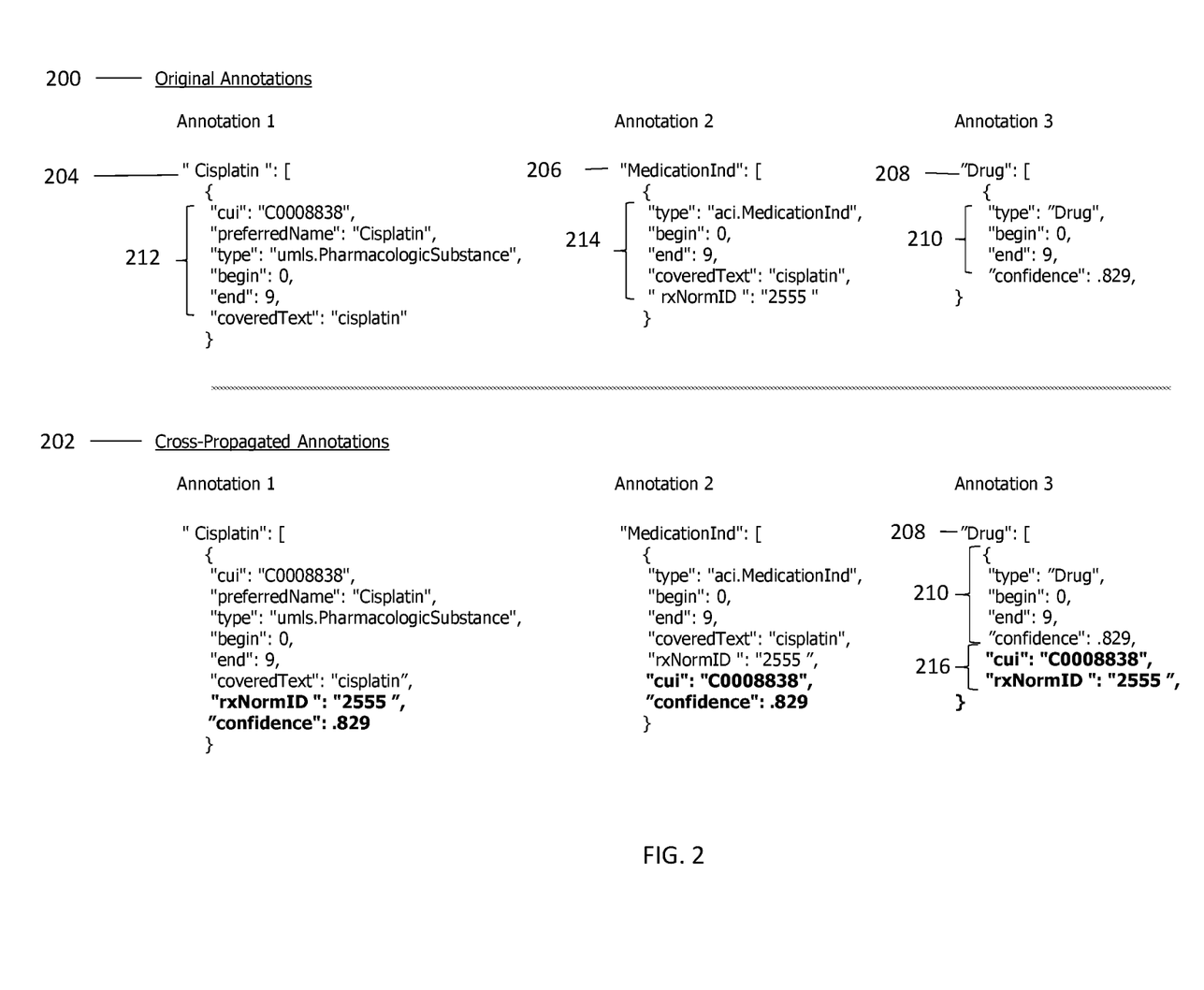
FIG. 2 illustrates exemplary annotations before and after cross-propagation of annotation metadata in accordance with one or more embodiments of the present invention.

Turning now to FIG. 2, an exemplary example illustrating cross-propagation of annotation metadata is shown. The illustration includes the original annotations 200 and the cross-propagated annotations 202 for three annotators. Each annotator produced a respective annotation 204, 206, 208, including "Cisplatin" 204, "medication" (MedicationInd) 206, and "drug" 208. Each of the annotations are related to each other as Cisplatin is a medication and a drug.

The annotation "Cisplatin" clearly indicates the associated text span relates to Cisplatin. Furthermore, the original annotation metadata 212 for "Cisplatin" 204 includes the metadata "CUI C008838", which is the concept unique identifier (CUI) C008838 for Cisplatin. However, as described above, the relevance of the annotations "MedicationInd" 206 and "drug" 208 are not readily apparent from just the annotations. The annotation "MedicationInd" 206 does include the annotation metadata "rxNormID 2555" 214, which is the identification number for Cisplatin. Therefore, a processing system reading the annotation metadata 214, would recognize the relevance. However, the annotation "drug" contains no relevant annotation metadata 210 and, therefore, it is unclear what drug the annotation "drug" 208 is referring to.

As illustrated, after cross-propagation, the original annotation metadata 210 for the annotation "drug" 208 has been supplemented with the cross-propagated annotation metadata 216 "CUI C008838" and "rxNormID 2555". Now, the annotation "drug" 206 reveals a clearer relationship to Cisplatin, which increases the value of the associated text span for further downstream processing.

Figure 3:
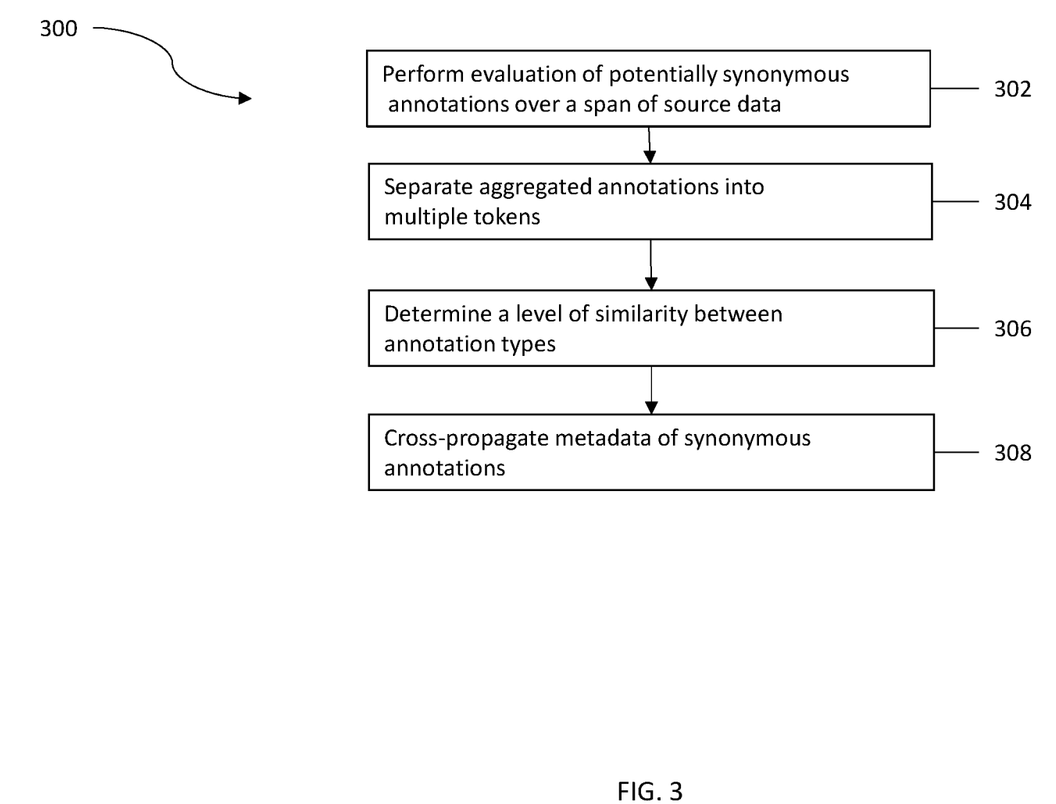
FIG. 3 illustrates a flow diagram of a process for cross-propagation of annotation metadata in accordance with one or more embodiments of the present invention.

Referring now to FIG. 3, a flow diagram of a process 300 for cross-propagation of annotation metadata in accordance with one or more embodiments of the present invention. At block 302 an evaluation is performed to determine whether annotations, including overlapping annotations, derived from processing unstructured data are a candidate of being synonymous with another annotation. For example, the method involves a pairwise comparison of the generated annotations. The pairwise evaluation includes setting a point value for criteria to determine whether the annotations are synonymous and the determination is be based on whether a threshold value is exceeded. At block 304 any candidate synonymous annotations that are aggregations of multiple tokens are divided into their respective individual tokens. At block 306, a determination is made as whether the divided annotations are synonymous. As described above, one method is to apply a word vector algorithm and determine whether the annotations are synonymous. At block 308, the annotation metadata from any determined synonymous annotations are compared to determine any common annotation metadata and distinct annotation metadata. The distinct annotation metadata is cross-propagated, such that each synonymous annotation has each respective instance of annotated metadata.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure that includes a network of interconnected nodes.

Figure 4:
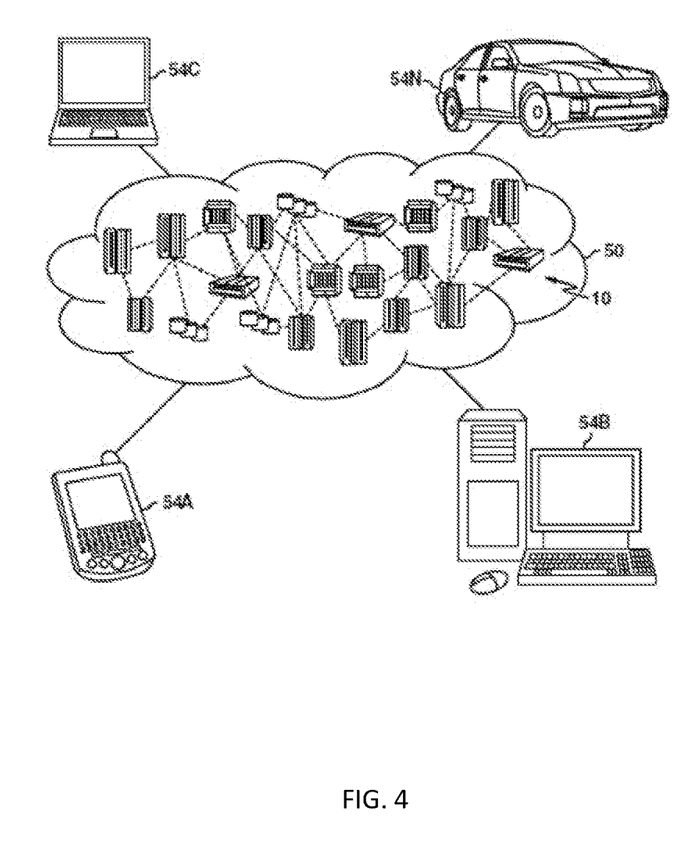
FIG. 4 depicts a cloud computing environment according to one or more embodiments of the present invention.

Referring now to FIG. 4, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 5:
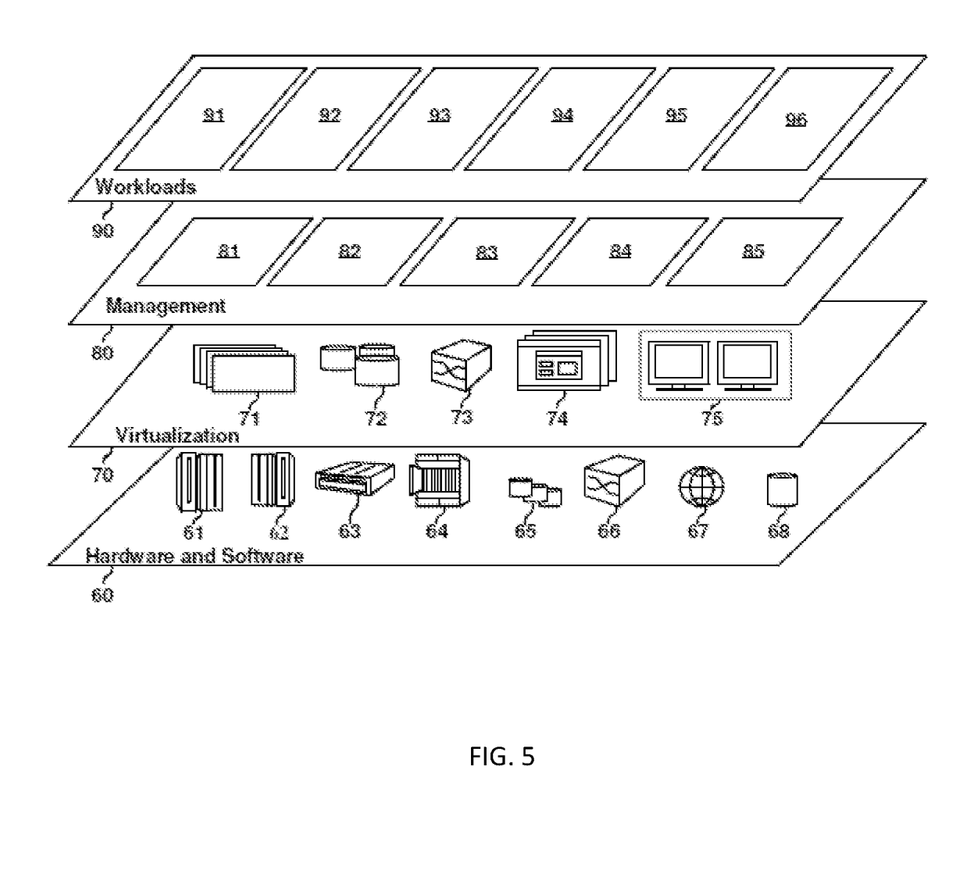
FIG. 5 depicts abstraction model layers according to one or more embodiments of the present invention.

Referring now to FIG. 5, a set of functional abstraction layers provided by cloud computing environment 50 (FIG. 5 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semantic searching against a corpus where relationship annotations do not exist 96.

Referring to FIG. 5, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

Figure 6:
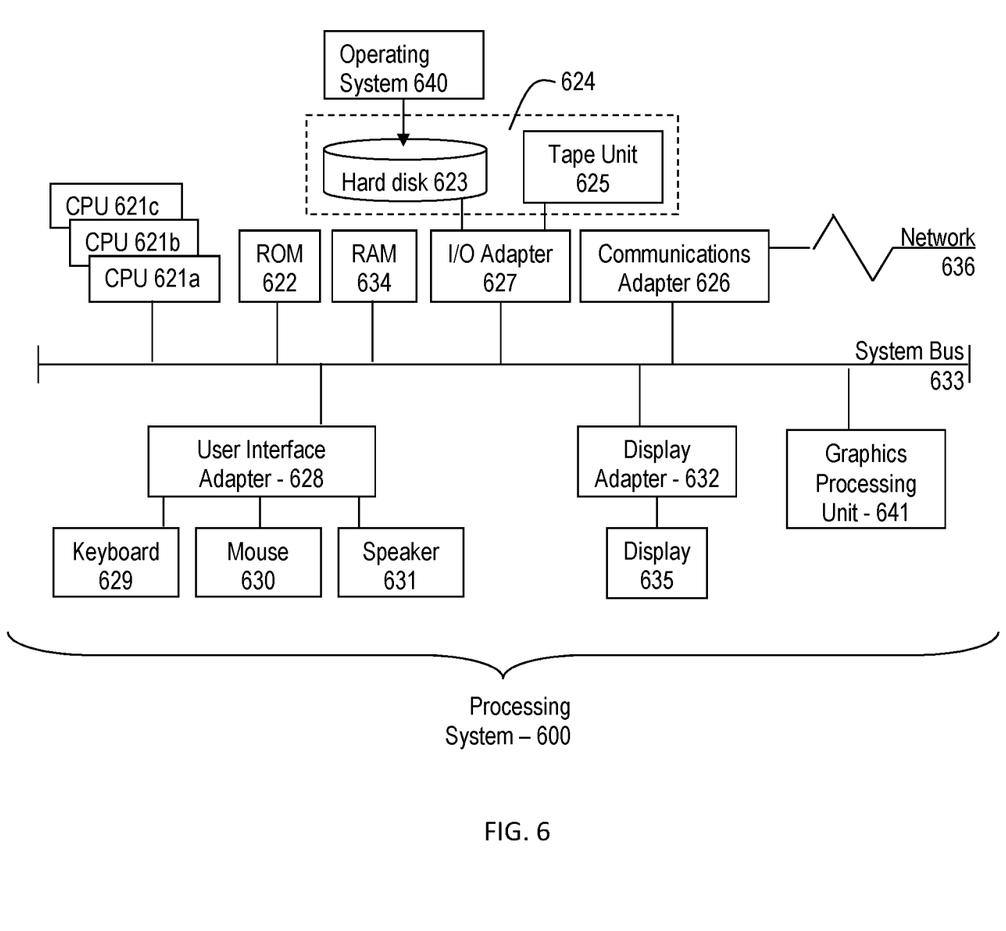
FIG. 6 depicts a block diagram of a computer system for use in implementing one or more embodiments of the present invention.

FIG. 6 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O buses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 6 the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 6

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    converting, by a processor, a document to plain text format;
    performing, by the processor, a comparison of a set of annotations, from the converted document in plain text format, to detect a subset of annotations that are candidates of being synonymous based on a first analysis;
    determining, by the processor, a first annotation of the subset of annotations is an aggregate of one or more tokens;
    dividing, by the processor, the first annotation into individual tokens; and
    determining, by the processor, whether each individual token is respectively synonymous with the second annotation of the subset of annotations based on a second analysis; and
    cross-propagating, by the processor, distinct annotation metadata of the first annotation with annotation metadata of the second annotation based on the second analysis.

2. The computer-implemented method of claim 1, wherein the first analysis is a pairwise comparison.

3. The computer-implemented method of claim 1, wherein the second analysis is a word vector comparison.

4. The computer-implemented method of claim 1, wherein each annotation of the set of annotations is generated by a respective annotator.

5. The computer-implemented method of claim 4, wherein each respective annotator is based on a respective model.

6. The computer-implemented method of claim 1, wherein the set of annotations are derived from a text span of unstructured data.

7. A system comprising:
    a memory having computer readable instructions; and
    one or more processors for executing the computer readable instructions, the computer readable instructions controlling the one or more processors to perform operations comprising:
    converting a document to plain text format;
    performing a comparison of a set of annotations, from the converted document in plain text format, to detect a subset of annotations that are candidates of being synonymous based on a first analysis;
    determining a first annotation of the subset of annotations is an aggregate of one or more tokens;
    dividing the first annotation into individual tokens; and
    determining whether each individual token is respectively synonymous with a second annotation of the subset of annotations based on a second analysis; and
    cross-propagating distinct annotation metadata of the first annotation with annotation metadata of second annotation based on the second analysis.

8. The system of claim 7, wherein the first analysis is a pairwise comparison.

9. The system of claim 7, wherein the second analysis is a word vector comparison.

10. The system of claim 7, wherein each annotation of the set of annotations is generated by a respective annotator.

11. The system of claim 10, wherein each respective annotator is based on a respective model.

12. The system of claim 7, wherein the set of annotations are derived from a text span of unstructured data.

13. A computer program product comprising a computer readable storage medium having program instructions embodied therewith, the program instructions executable by a processor to cause the processor to perform operations comprising:

converting a document to plain text format;

performing a comparison of a set of annotations to detect a subset of annotations, from the converted document in plain text format, that are candidates of being synonymous based on a first analysis;

determining a first annotation of the subset of annotations is an aggregate of one or more tokens;

dividing the first annotation into individual tokens; and         determining whether each individual token is respectively synonymous with a second annotation of the subset of annotations based on a second analysis; and     cross-propagating distinct annotation metadata of the first annotation with annotation metadata of second annotation based on the second analysis.

14. The computer program product of claim 13, wherein the first analysis is a pairwise comparison.

15. The computer program product of claim 13, wherein the second analysis is a word vector comparison.

16. The computer program product of claim 13, wherein each annotation of the set of annotations is generated by a respective annotator.

17. The computer program product of claim 16, wherein each respective annotator is based on a respective model.

\* \* \* \* \*